United States Patent
Nile et al.

(10) Patent No.: US 12,093,275 B2
(45) Date of Patent: Sep. 17, 2024

(54) PETROTECHNICAL DATA INGESTION FRAMEWORK

(71) Applicant: Schlumberger Technology Corporation, Sugar Land, TX (US)

(72) Inventors: Ramchandra Nile, Pune (IN); Niranjan Madhukar Karvekar, Pune (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 130 days.

(21) Appl. No.: 17/662,310

(22) Filed: May 6, 2022

(65) Prior Publication Data
US 2023/0359641 A1    Nov. 9, 2023

(51) Int. Cl.
| | | |
|---|---|---|
| G06F 16/25 | (2019.01) | |
| G06F 9/54 | (2006.01) | |
| G06F 16/23 | (2019.01) | |
| G06F 16/2458 | (2019.01) | |
| H04L 9/40 | (2022.01) | |
| H04L 67/133 | (2022.01) | |

(52) U.S. Cl.
CPC ............ G06F 16/25 (2019.01); G06F 9/547 (2013.01); G06F 16/23 (2019.01); G06F 16/2477 (2019.01); H04L 9/40 (2022.05); H04L 67/133 (2022.05)

(58) Field of Classification Search
CPC . H04L 43/14; H04L 67/12; H04L 9/40; H04L 67/01; H04L 67/133; G06F 3/0484; G06F 8/34; G06F 9/451; G06F 9/547; G06F 16/27; G06F 11/302; G06F 16/23; G06F 16/25; G06F 16/2477; G06F 9/54; G06F 11/30
See application file for complete search history.

(56) References Cited

U.S. PATENT DOCUMENTS

| | | | | |
|---|---|---|---|---|
| 2021/0116903 | A1* | 4/2021 | Bouzon | ............... G05B 19/048 |
| 2021/0160288 | A1* | 5/2021 | Crabtree | ................. H04L 63/20 |
| 2022/0060510 | A1* | 2/2022 | Clayton | .............. H04L 63/1408 |
| 2022/0308903 | A1* | 9/2022 | Chakraborty | ....... G06F 3/04817 |

OTHER PUBLICATIONS

Martin, "The Clean Architecture", The Clean Code Blog, Aug. 13, 2012, 15 pages. Available at: https://blog.cleancoder.com/uncle-bob/2012/08/13/the-clean-architecture.html.

* cited by examiner

*Primary Examiner* — Marcin R Filipczyk
(74) *Attorney, Agent, or Firm* — Jeffrey D. Frantz

(57) ABSTRACT

A method, apparatus, and program product utilize a data ingestion framework for petrotechnical data that incorporates a REST API agent service that implements common agent functionality used to interact with various data sources in combination with dedicated source-specific agent plugins to minimize the development efforts required to integrate new data sources into a petrotechnical data ingestion system.

16 Claims, 3 Drawing Sheets

PETROTECHNICAL DATA INGESTION FRAMEWORK

BACKGROUND

Many industries generate a huge amount of data each day, including, for example, the oil & gas industry. The information extracted from this data often drives decision making, and many decisions rely on accurate data and information. Ingesting such generated data into data repositories for analysis and/or access by other computer systems can be particularly challenging, as the potential data sources that may need to be supported can be considerable, and these data sources may have differing interface requirements, data structures, output formats, etc. For oil & gas production data, as an example, data may be output by data sources in a variety of formats such as ODBC, CSV, and various proprietary formats, and each data source may require specific credentials and interfaces for obtaining stored data.

In some data ingestion systems, substantial development efforts may be required in order to support integrate different sources, and the addition of new data sources may require development of custom program code in order to access and retrieve desired data from those sources. The requirement for developing custom program code, however, is generally undesirable due to the additional overhead, delays in bringing new data sources online, and the added potential for bugs or errors that could lead to additional overhead and delays if problems later arise.

SUMMARY

The embodiments disclosed herein provide a method, apparatus, and program product that utilize a data ingestion framework for petrotechnical data that incorporates a REpresentational State Transfer (REST) Application Programming Interface (API) agent service that implements common agent functionality used to interact with various data sources in combination with dedicated source-specific agent plugins to minimize the development efforts required to integrate new data sources into a petrotechnical data ingestion system.

Therefore, consistent with one aspect of the invention, a data processing system for ingesting petrotechnical data may include one or more memories and one or more processors, and a petrotechnical data ingestion system including program code stored in the one or more memories and executed by the one or more processors to ingest petrotechnical data from a plurality of data sources. The petrotechnical data ingestion system may include an ingestion services component configured to manage ingestion of petrotechnical structural and/or timeseries data from the plurality of data sources, a REpresentational State Transfer (REST) Application Programming Interface (API) agent service in communication with the ingestion services component and configured to register the plurality of data sources with the petrotechnical data ingestion system, and a plurality of source-specific plugins, each associated with a specific data source among the plurality of data sources and configured to retrieve petrotechnical structural and/or timeseries data from the specific data source using specific request and response formats associated with the specific data source. The REST API agent service may further be configured to request first petrotechnical structural and/or timeseries data from a first data source among the plurality of data sources using a source-independent request to the associated source-specific plugin for the first data source, receive the first petrotechnical structural and/or timeseries data from the first data source in a source-independent format from the associated source-specific plugin for the first data source, and publish the received first petrotechnical structural and/or timeseries data to the ingestion services component for ingestion into the petrotechnical data ingestion system.

Also, in some embodiments, the associated source-specific plugin for the first data source is configured to generate a source-specific request in response to receiving the source-independent request, and to convert source-specific data received from the first data source into the source-independent format. Further, in some embodiments, the REST API agent service is configured to request the first petrotechnical structural and/or timeseries data from the first data source by issuing a first request to the associated source-specific plugin for the first data source to retrieve structural data from the first data source, and based upon the structural data retrieved from the first data source, issuing a second request to the associated source-specific plugin for the first data source to retrieve timeseries data from the first data source.

In some embodiments, the REST API agent service is further configured to detect an associated source-specific plugin for a new data source, and in response to detecting the associated source-specific plugin for the new data source, register the new data source with the petrotechnical data ingestion system. Also, in some embodiments, the REST API agent service is configured to detect the associated source-specific plugin for the new data source during startup of the REST API agent service. In some embodiments, the REST API agent service is configured to dynamically detect the associated source-specific plugin for the new data source during runtime.

Further, in some embodiments, the petrotechnical data ingestion system further includes a plugin interface that includes interface definitions supported by the source-specific plugins for the plurality of data sources. Some embodiments may also include a datastore, and the ingestion services component is configured to ingest the received first petrotechnical structural and/or timeseries data into the petrotechnical data ingestion system by storing the received first petrotechnical structural and/or timeseries data in the datastore. In addition, in some embodiments, the first petrotechnical structural and/or timeseries data includes production data, and the data processing system further includes a production monitoring application and/or a data analysis service configured to access the first petrotechnical structural and/or timeseries data stored in the datastore.

Consistent with another aspect of the invention, a method of ingesting petrotechnical data from a plurality of data sources in a petrotechnical data ingestion system may include managing ingestion of petrotechnical structural and/or timeseries data from the plurality of data sources using an ingestion services component, registering the plurality of data sources with the petrotechnical data ingestion system using a REpresentational State Transfer (REST) Application Programming Interface (API) agent service in communication with the ingestion services component, request first petrotechnical structural and/or timeseries data from a first data source among the plurality of data sources with the REST API agent service using a source-independent request to an associated source-specific plugin for the first data source, in the associated source-specific plugin for the first data source and in response to receiving the source-independent request, requesting the first petrotechnical structural and/or timeseries data from the first data source using a source-specific request format associated with the first data source, in the associated source-specific plugin for the first data source and in response to a response received from the first data source, receiving the first petrotechnical structural and/or timeseries data in a source-specific format associated with the first data source and converting the first petrotechnical structural and/or timeseries data into a source-independent format, and in the REST API agent service, publishing the received first petrotechnical structural and/or timeseries data in the source-independent format to the ingestion services component for ingestion into the petrotechnical data ingestion system.

Further, in some embodiments, requesting the first petrotechnical structural and/or timeseries data from the first data source with the REST API agent service includes issuing a first request to the associated source-specific plugin for the first data source to retrieve structural data from the first data source, and based upon the structural data retrieved from the first data source, issuing a second request to the associated source-specific plugin for the first data source to retrieve timeseries data from the first data source. Also, in some embodiments, each of the plurality of data sources includes an associated source-specific plugin.

In addition, some embodiments may also include, in the REST API agent service, detecting an associated source-specific plugin for a new data source, and in response to detecting the associated source-specific plugin for the new data source, registering the new data source with the petrotechnical data ingestion system. In some embodiments, detecting the associated source-specific plugin for the new data source is performed during startup of the REST API agent service. In addition, in some embodiments, detecting the associated source-specific plugin for the new data source is performed dynamically during runtime.

Also, in some embodiments, the petrotechnical data ingestion system further includes a plugin interface that includes interface definitions supported by the source-specific plugins for the plurality of data sources. In addition, some embodiments may also include, in the ingestion services component, ingesting the received first petrotechnical structural and/or timeseries data into the petrotechnical data ingestion system by storing the received first petrotechnical structural and/or timeseries data in a datastore. In addition, in some embodiments, the first petrotechnical structural and/or timeseries data includes production data, and the method further includes consuming the first petrotechnical structural and/or timeseries data stored in the datastore using a production monitoring application and/or a data analysis service.

Consistent with another aspect of the invention, a program product may include a non-transitory computer readable medium, and program code stored on the computer readable medium and configured upon execution by one or more processors to ingest petrotechnical data from a plurality of data sources. The program code may implement a petrotechnical data ingestion system that includes an ingestion services component configured to manage ingestion of petrotechnical structural and/or timeseries data from the plurality of data sources, a REpresentational State Transfer (REST) Application Programming Interface (API) agent service in communication with the ingestion services component and configured to register the plurality of data sources with the petrotechnical data ingestion system, and a plurality of source-specific plugins, each source-specific plugin associated with a specific data source among the plurality of data sources and configured to retrieve petrotechnical structural and/or timeseries data from the specific data source using specific request and response formats associated with the specific data source. In addition, the REST API agent service may further be configured to request first petrotechnical structural and/or timeseries data from a first data source among the plurality of data sources using a source-independent request to the associated source-specific plugin for the first data source, receive the first petrotechnical structural and/or timeseries data from the first data source in a source-independent format from the associated source-specific plugin for the first data source, and publish the received first petrotechnical structural and/or timeseries data to the ingestion services component for ingestion into the petrotechnical data ingestion system.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

The herein-described embodiments provide a method, apparatus, and program product that utilize a data ingestion framework for petrotechnical data that incorporates a REST API agent service that implements common agent functionality used to interact with various data sources in combination with dedicated source-specific agent plugins to minimize the development efforts required to integrate new data sources into a petrotechnical data ingestion system.

Oil & Gas Hardware and Software Environment

Figure 1:
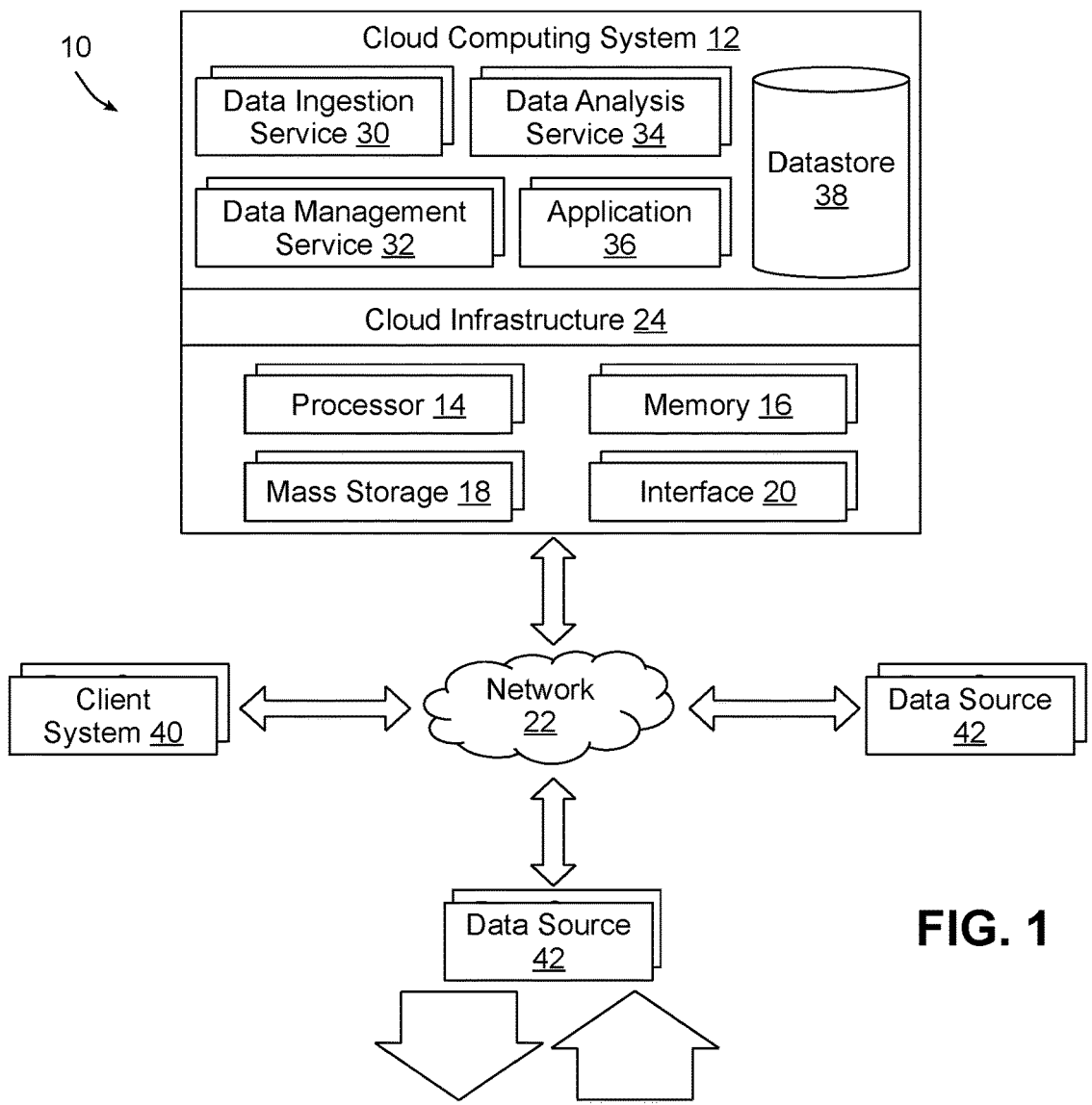
FIG. 1 is a block diagram of an example hardware, software and geologic environment for a petrotechnical data processing system in accordance with implementation of various technologies and techniques described herein.
Figure 1:
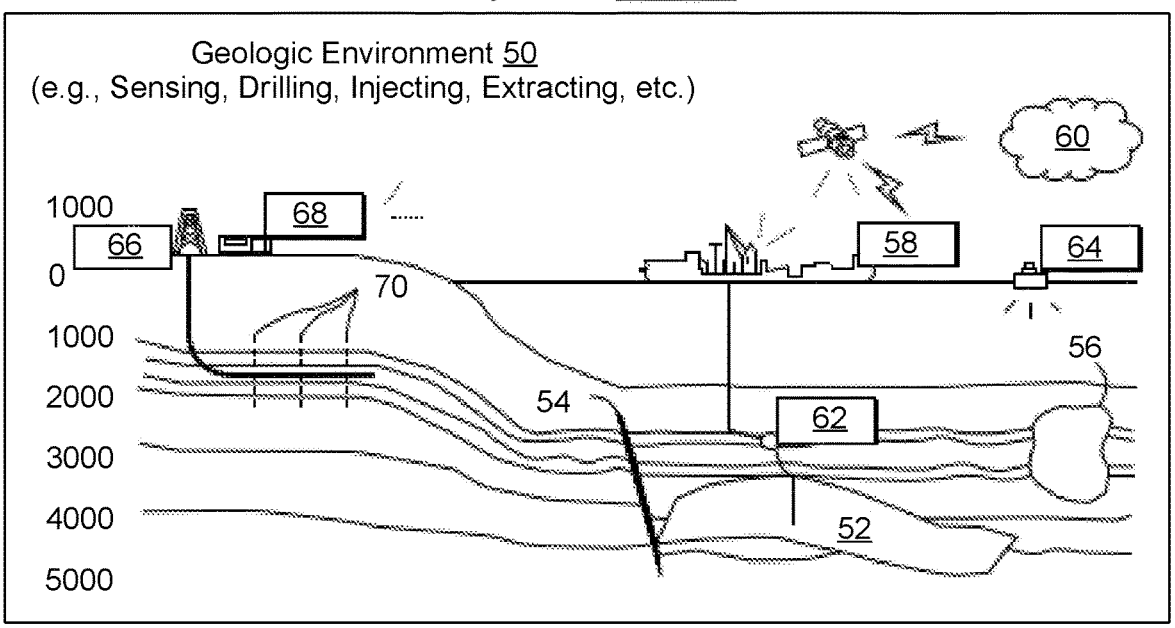

Turning now to the drawings, wherein like numbers denote like parts throughout the several views, FIG. 1 illustrates an example data processing system 10 in which the various technologies and techniques described herein may be implemented, e.g., in connection with various oil & gas or petrotechnical applications. System 10 is illustrated as including a cloud computing system 12 that may be hosted on one or more computers, servers, and/or other computing devices, and generally including various architectures includes one or more hardware-based processors or processing cores 14 and one or more memories 16, which may represent the random access memory (RAM) devices, as well as any supplemental levels of memory, e.g., cache memories, non-volatile or backup memories (e.g., programmable or flash memories), read-only memories, etc. In addition, each memory 16 may be considered to include memory storage physically located elsewhere in a computer or data processing system, e.g., any cache memory in a microprocessor or processing core, as well as any storage capacity used as a virtual memory, e.g., as stored on a mass storage device 18 or on another computer. Each mass storage device 18, for example, may be an internal hard disk storage device, external hard disk storage devices, solid state storage device, storage area network device, network attached storage device, etc.

Cloud computing system 12 may also include one or more interfaces 20 for receiving inputs and/or generating outputs for communicating information externally. One or more of such interfaces 20 may include a network interface coupled to a network, e.g., network 22, which may include, for example, internal networks, area networks, external networks, private networks, wired networks, wireless networks, and/or public networks such as the Internet. In addition, for interface with a user or operator, one or more of interfaces 20 may include a user interface incorporating one or more user input/output devices, e.g., a keyboard, a pointing device, a display, a printer, etc. Otherwise, user input may be received over a network 22.

Cloud computing system 12 may also include a cloud infrastructure 24 that serves to abstract the underlying hardware components 14-20 and provide various cloud management functions such as virtualization, load balancing, etc., and in many respects functions as a computing platform or operating system capable of hosting various computer software applications, components, programs, objects, modules, data structures, etc. For example, cloud computing system 12 in some embodiments may host one or more data ingestion services 30, one or more data management services, and one or more data analysis services 34, as well as other petrotechnical applications 36 as will be appreciated by those of ordinary skill having the benefit of the instant disclosure. Each data ingestion service 30 may be used, for example, to ingest petrotechnical and/or other data into one or more datastores 38, while each data management service 32 may be used to manage and otherwise provide access to the data stored in datastore(s) 38, e.g., by data analysis service(s) 34 for the purpose of data and/or statistical analysis, visualization, pattern recognition, etc., by various petrotechnical application(s) 36, or by various external computers, systems, or services, e.g., one or more client systems 40. Client systems 40 may also access various other cloud components, including, for example, data analysis services 34 and/or petrotechnical applications 36.

In the illustrated embodiment, a data ingestion service 30 may be configured to ingest data from one or more data sources 42. Each data source 42, for example, may communicate to data ingestion service 30 petrotechnical and/or other data that has been sensed, collected, gathered, or otherwise provided to the data source for inclusion and/or processing within cloud computing system 12. In some embodiments, for example, a data source 42 may communicate petrotechnical and/or other data collected from a geologic environment 50, which may include various layers (e.g., stratification) that include a reservoir 52 and one or more other features such as a fault 54, a geobody 56, etc. As an example, geologic environment 50 may be outfitted with any of a variety of sensors, detectors, actuators, etc. For example, equipment 58 may include communication circuitry to receive and to transmit information with respect to one or more networks 60. Such information may include information associated with downhole equipment 62, which may be equipment to acquire information, to assist with resource recovery, etc. Other equipment 64 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with network 60 that may be configured for communications, noting that the satellite may additionally or instead include circuitry for imagery (e.g., spatial, spectral, temporal, radiometric, etc.).

Geologic environment 50 may also, in some embodiments, include equipment 66 and/or 68 associated with a well that includes a substantially horizontal portion that may intersect with one or more fractures 70. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, equipment 66 and/or 68 may include components, a system, systems, etc. for fracturing, seismic sensing, analysis of seismic data, assessment of one or more fractures, etc. Also, in some embodiments, equipment 66 and/or 68 may include one or more surface networks, production facilities, processing facilities, storage facilities, etc. associated with conveying and/or processing produced hydrocarbons, and from which data may be collected. Production may also include injection wells for added recovery.

The data provided by a data source may include, in various embodiments, timeseries data such as historical data, real time data, or combinations thereof, as well as user inputs, economic information, and/or other measurement data and other parameters of interest. Some data may be used, for example, to generate models of the environment to determine characteristics thereof, or to measure changes over time. Some data may include seismic data, core data, exploration data, development data, log data, fluid flow data, production data, and/or practically any other type of petrotechnical data associated with exploration, development and/or production for a geologic environment.

It will be appreciated that the herein-described techniques may be implemented in a number of different computers, computer systems, devices, etc. In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Petrotechnical Data Ingestion Framework

The ingestion of petrotechnical data such as production data can be complicated by the wide variety of data sources that may need to be integrated in order to properly ingest the data. Various production-related data sources, for example, output structure and timeseries data in various formats including proprietary formats as well as non-proprietary formats such as ODBC (Open Database Connectivity), CSV (Comma Separated Values), etc. Many data sources moreover expose their data through REpresentational State Transfer (REST) Application Programming Interfaces (APIs) that can vary from data source to data source, in terms of authentication requirements, request formats, response formats, etc.

In some data ingestion systems, agents are used to fetch structural and timeseries data from a source system, and a common layer in the system is used to ingest the data for storage in a datastore and/or use by different consumers for their respective workflows. In such systems, the agents are separately developed and maintained for different data sources, and activation of a particular agent in such systems generally requires that the agent be registered and started, and then provided with structure configuration by the common layer to instruct the agent as to the various types of entities that will be needed to be fetched from the data source. Once the structure configuration is received by the agent, the agent then fetches the structural data from the data source and uses the common layer to ingest the structural data. The common layer then provides the agent with the properties to be fetched, and the agent then begins to fetch timeseries data from the data source corresponding to the received properties and ingest the received timeseries data using the common layer.

Support for a new data source in such data ingestion systems generally requires that a new agent be developed to support the new data source, that the new agent be deployed to the data ingestion system and configured to communicate with the common layer, and that the new agent then be started to initiate the fetching of the structural and timeseries data. Developing and maintaining agents for all supported data sources, in particular, requires substantial overhead and introduces additional pathways for errors, and can delay the incorporation of new data sources.

Embodiments consistent with the invention, in contrast, utilizes a generic data ingestion framework that incorporates a REST agent service that incorporates much of the common functionality of REST agents and that interfaces with source-specific plugins that manage the specific functionality required for particular data sources. By doing so, both development and maintenance efforts are reduced, and incorporation of new data sources is greatly accelerated.

Figure 2:
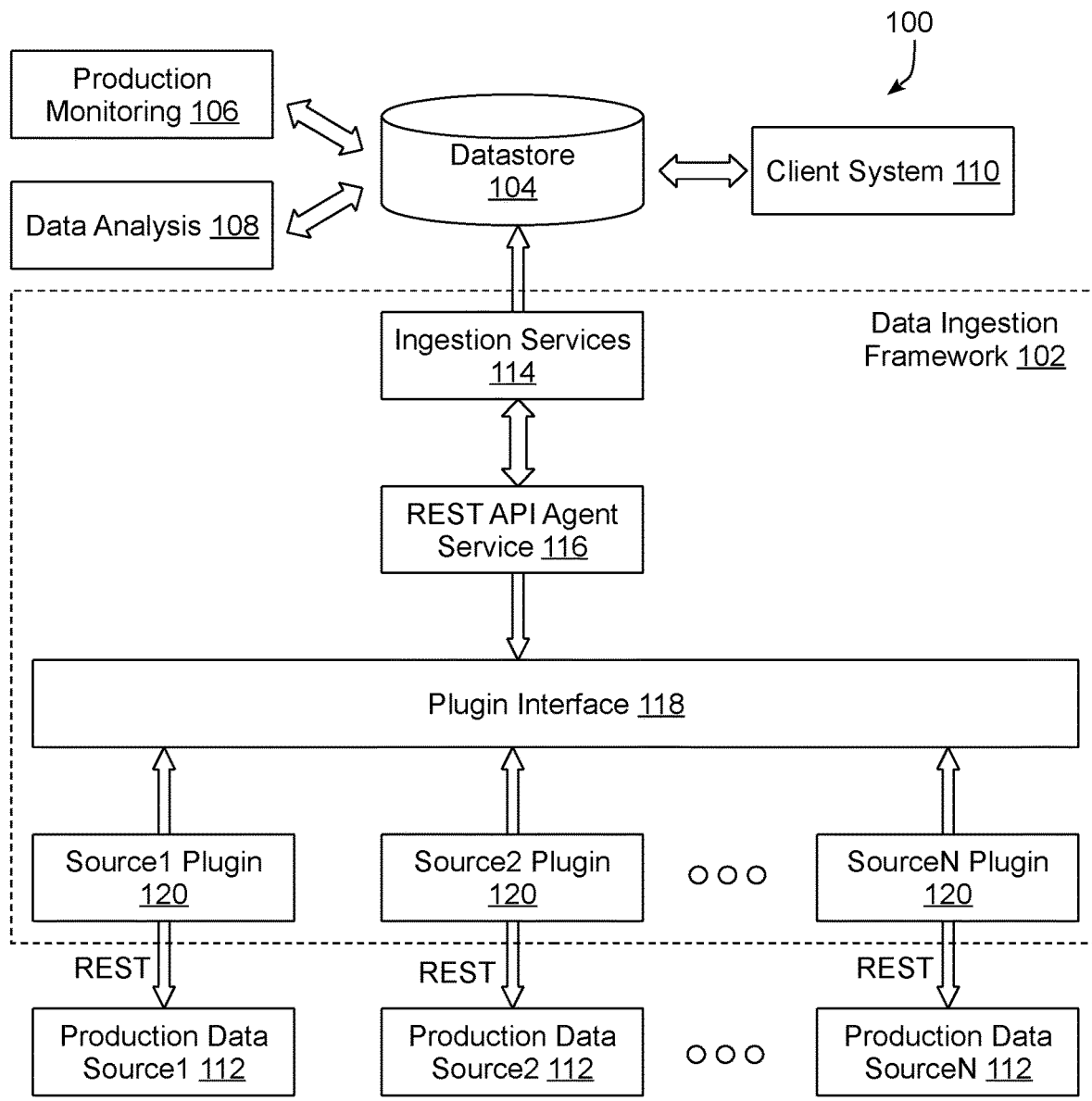
FIG. 2 is a block diagram of a petrotechnical cloud service incorporating a data ingestion framework and suitable for use in the petrotechnical data processing system of FIG. 1.

FIG. 2, for example, illustrates an example petrotechnical cloud service 100 that utilizes a generic data ingestion framework 102 to ingest data into a datastore 104, e.g., for use in various types of workflows and by various types of consumers. In the illustrated embodiment, for example, production-related petrotechnical data, i.e., petrotechnical data associated with the production of hydrocarbons from a subterranean formation, may be ingested into datastore 104 for use by various consumers such as a production monitoring application 106, various data analysis services or tools 108 and/or one or more client systems 110. Petrotechnical cloud service 100 may be implemented, for example, in the manner described above for data processing system 10 of FIG. 1, or in other data processing systems, as will be appreciated by those of ordinary skill having the benefit of the instant disclosure.

Data ingestion framework 102 may be used to ingest data through a plurality of production data sources 112, each of which capable of being accessed through a REST API that is specific to that data source. Data ingestion framework 102 utilizes as a common layer an ingestion services component 114 that manages data ingestion activities. A REST API agent service 116 interacts asynchronously with ingestion services component 114 and incorporates common REST API functionality. A plugin interface 118 interfaces REST API agent service 116 with source-specific source plugins or adapters 120 that respectively interact with data sources 112.

Plugin Interface 118 in particular includes the interface definitions that every source plugin is required to implement, and thus defines a set of source-independent requests supported by all data source plugins. REST API agent service 116 includes, among other responsibilities, functionality for loading source plugins dynamically into the framework, registering data sources, and processing structure and timeseries data, e.g., through the source-independent requests supported by the source-specific plugins. In some embodiments, for example, REST API agent service 116 may be configured to automatically register new sources, obtain structure and/or timeseries configurations from ingestion services component 114, and implement common processing logic such as scheduling logic to fetch incremental data, caching configurations, tracking progress, etc. Moreover, in some embodiments, REST API agent service may be a scalable cloud service to support any number of data sources, e.g., through the use of multiple instances that interact with different data source as needed.

Each source plugin 120 in turn is developed to read data from a particular data source through that data source's specific REST API, and according to the data source's specific request and response formats. In addition, each source plugin 120 is configured to process source-independent requests from the REST API agent service 116, as well as to format data received from a data source into a source-independent data format for processing by the REST API agent service. It will be appreciated that in some instances, the responses of some REST APIs may include additional complexities such as specific data formats like nested blocks or arrays, and as such, each source plugin may be configured with a specific codebase adapted to read data from the respective data source for which it has been developed.

Thus, in contrast with conventional data ingestion systems, source-specific agents are not required, and instead substantially smaller and simpler plugins are used to fetch structural and timeseries data from a data source. In addition, in some embodiments, the various components illustrated in FIG. 2 may be designed using a clean architecture approach.

Figure 3:
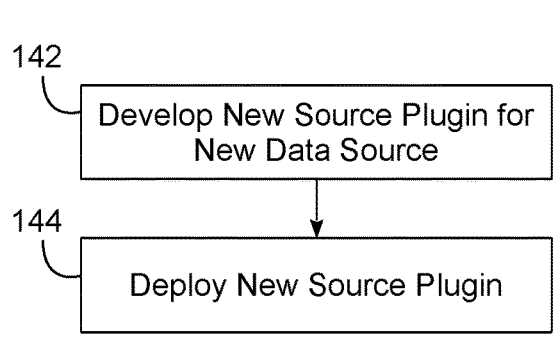
FIG. 3 is a flowchart illustrating a sequence of operations for incorporating a new data source into the petrotechnical cloud service of FIG. 2.

As illustrated in FIG. 3, for example, in many instances the incorporation of a new data source into data ingestion petrotechnical cloud service 100 may be performed using sequence of operations 140. Specifically, a new source plugin may be developed for a new data source (block 142), and may be configured to handle any desired requests and responses to and from a particular data source, as well as to support the various source-independent request and response formats defined by the plugin interface. Once developed, the new source plugin may be deployed into the data ingestion framework (block 144) in order to incorporate the new data source into the petrotechnical cloud service. Deployment may include, for example, copying the source plugin code into a common location such as a predetermined folder or directory of source plugins in some embodiments, such that the REST API agent service detects, loads and automatically registers the source.

Figure 4:
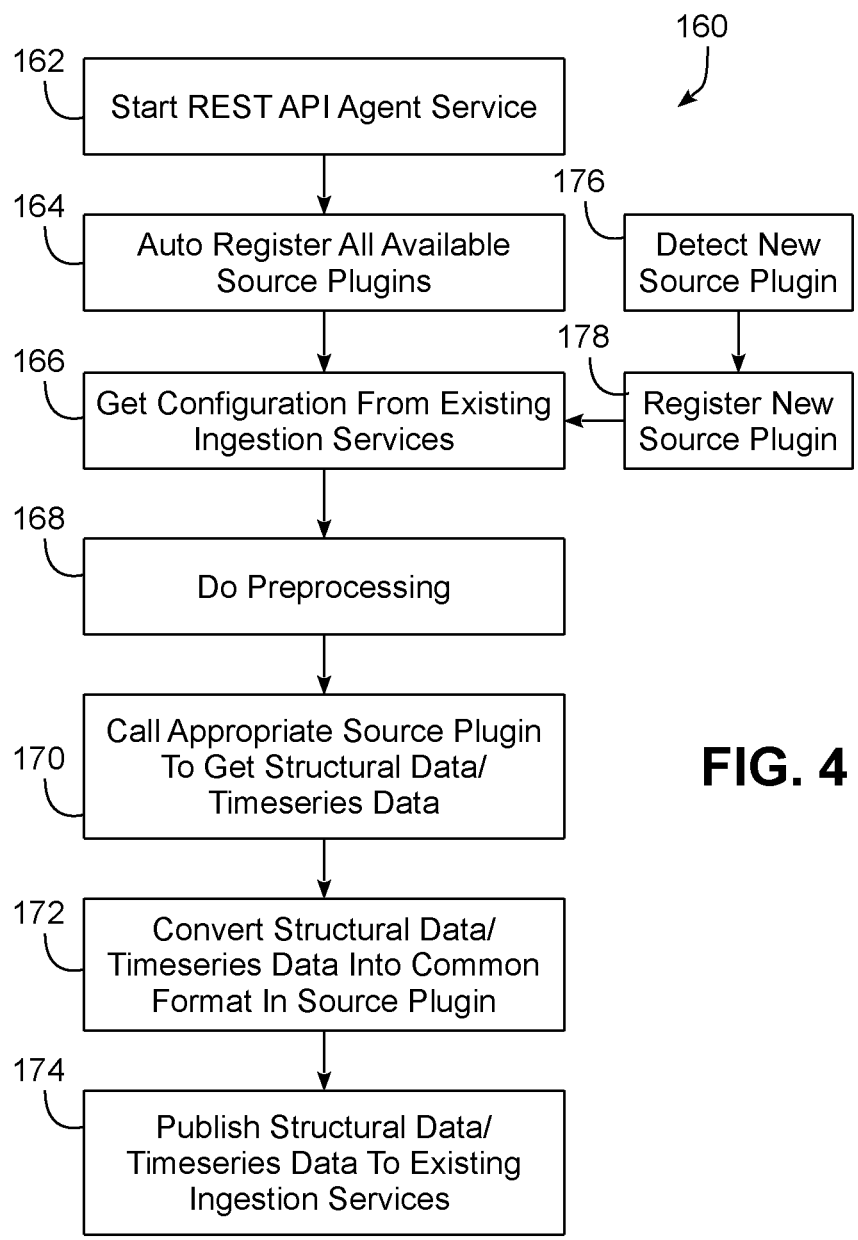
FIG. 4 is a flowchart illustrating a sequence of operations for activating and accessing one or more source plugins in the petrotechnical cloud service of FIG. 2.

FIG. 4 illustrates an example sequence of operations 160 for activating and utilizing one or more data source plugins in petrotechnical cloud service 100 of FIG. 2. First, in block 162, the REST API agent service is started, and once started, all available source plugins (e.g., all source plugins found in a dedicated directory or folder in some embodiments) are automatically registered (block 164). Next, in block 166, the REST API agent service interacts with the ingestion services component to receive structure configuration for each data source (e.g., all of the entity types that will be fetched from each data source). Preprocessing is then performed in block 168. In some embodiments, for example, preprocessing may include caching configurations, conversion of an ingestion service request format to a common model used by the plugin interface, scheduling incremental jobs to fetch structural/timeseries data as per configuration, and tracking the progress of what is fetched to avoid repeatedly fetching the same data, etc.

Blocks 170-174 next illustrate the ingestion of data from a particular data source. For the purposes of this explanation, structural and timeseries data are referenced interchangeably, as it may be desired in different embodiments to retrieve structural and/or timeseries data in different orders and/or at different times. In some instances, for example, structural data may first be requested and received in order to determine the types of available properties, and then the timeseries data constituting values for one or more properties may then be retrieved based upon the received structural data. In one particular example, and within a production context, structural data may include, for example, metadata identifying a particular well, oil field, etc., while the timeseries data may include oil production values with associated timestamps for a particular well or oil field.

Thus, in block 170, the REST API agent service calls the source plugin for the data source using a source-independent request (e.g., as defined by the plugin interface) to the source plugin to obtain the desired structural data and/or timeseries data from the data source, and it will be appreciated that the source plugin codebase includes the functionality for issuing appropriately-formatted source-specific requests to the data source in response to the source-independent request. Then, as illustrated in block 172, the source plugin receives the response from the data source, e.g., in a source-specific format, and converts the structural and/or timeseries data into a source-independent format appropriate for the REST API agent service (e.g., as defined by the plugin interface). Then, in block 174, the REST API agent service publishes the structural and/or timeseries data to the ingestion services component to ingest the data into the datastore.

It will be appreciated that source plugins may support push and/or pull protocols. A push protocol, for example, may be implemented by having the source plugin register with the data source with an appropriate callback function so that the source plugin is notified whenever new data is available. A pull protocol, on the other hand, may be implemented by having a source plugin poll the data source at predetermined intervals.

Blocks 176 and 178 also illustrate that, rather than detecting and registering source plugins at startup, a REST API agent service may also, in some embodiments, dynamically detect and register new source plugins during runtime. Specifically, as illustrated in block 176, a new source plugin may be detected, e.g., based upon periodic monitoring of a plugin folder or directory for new plugins. Upon detecting a new source plugin, block 178 may then register the new source plugin in a similar manner to that described above for block 164. Control then may proceed to block 166 to activate and initialize the new data source in the same manner as described above for blocks 166-168.

It will be appreciated that implementation of the aforementioned functionality into a framework as described herein would be well within the abilities of those of ordinary skill having the benefit of the instant disclosure. In addition, while particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A data processing system for ingesting petrotechnical data, the data processing system comprising:
one or more memories and one or more processors; and
a petrotechnical data ingestion system including program code stored in the one or more memories and executed by the one or more processors to ingest petrotechnical data from a plurality of data sources, the petrotechnical data ingestion system including:
an ingestion services component configured to manage ingestion of petrotechnical structural and/or timeseries data from the plurality of data sources;
a REpresentational State Transfer (REST) Application Programming Interface (API) agent service in communication with the ingestion services component and configured to register the plurality of data sources with the petrotechnical data ingestion system;
a plurality of source-specific plugins, each source-specific plugin associated with a specific data source among the plurality of data sources and configured to retrieve petrotechnical structural and/or timeseries data from the specific data source using specific request and response formats associated with the specific data source; and
a plugin interface comprising interface definitions supported by the plurality of source-specific plugins associated with the plurality of data sources to define a set of source-independent requests supported by the plurality of source-specific plugins;
wherein the REST API agent service is further configured to request first petrotechnical structural and/or timeseries data from a first data source among the plurality of data sources using a source-independent request of the set of source-independent requests to a first source-specific plugin of the plurality of source-specific plugins, wherein the first source-specific plugin is associated with the first data source, wherein the source-independent request comprises a source-independent format supported by all of the plurality of source-specific plugins;
wherein the first source-specific plugin is further configured to issue a source specific request to the first data source in response to the source-independent request from the REST API, wherein the source-specific request comprises an appropriately-formatted source-specific format corresponding to a source-specific format of the first data source for interaction with the first data source;
wherein the first source-specific plugin is further configured to receive a response from the first data source in the appropriately-formatted source-specific format corresponding to the first data source, wherein the response comprises the first petrotechnical structural and/or timeseries data;
wherein the first source-specific plugin is further configured to convert the response from the appropriately-formatted source-specific format into the source-independent format;
wherein the REST API agent service is further configured to receive the first petrotechnical structural and/or timeseries data from the first data source in the source-independent format from the first source-specific plugin for the first data source as received first petrotechnical structural and/or timeseries data; and
wherein the REST API agent service is further configured to publish the received first petrotechnical structural and/or timeseries data to the ingestion services component for ingestion into the petrotechnical data ingestion system.

2. The data processing system of claim 1, wherein the REST API agent service is configured to request the first petrotechnical structural and/or timeseries data from the first data source by:
issuing the source-independent request to the first source-specific plugin for the first data source to retrieve structural data from the first data source; and
based upon the structural data retrieved from the first data source, issuing a second source-independent request to the first source-specific plugin for the first data source to retrieve timeseries data from the first data source.

3. The data processing system of claim 1, wherein the REST API agent service is further configured to detect an associated source-specific plugin for a new data source, and in response to detecting the associated source-specific plugin for the new data source, register the new data source with the petrotechnical data ingestion system.

4. The data processing system of claim 3, wherein the REST API agent service is configured to detect the associated source-specific plugin for the new data source during startup of the REST API agent service.

5. The data processing system of claim 3, wherein the REST API agent service is configured to dynamically detect the associated source-specific plugin for the new data source during runtime.

6. The data processing system of claim 1, further comprising a datastore, wherein the ingestion services component is configured to ingest the received first petrotechnical structural and/or timeseries data into the petrotechnical data ingestion system by storing the received first petrotechnical structural and/or timeseries data in the datastore.

7. The data processing system of claim 6, wherein the first petrotechnical structural and/or timeseries data includes production data, and wherein the data processing system further comprises a production monitoring application and/or a data analysis service configured to access the first petrotechnical structural and/or timeseries data stored in the datastore.

8. A method of ingesting petrotechnical data from a plurality of data sources in a petrotechnical data ingestion system, the method comprising:
managing ingestion of petrotechnical structural and/or timeseries data from the plurality of data sources using an ingestion services component;
registering the plurality of data sources with the petrotechnical data ingestion system using a REpresentational State Transfer (REST) Application Programming Interface (API) agent service in communication with the ingestion services component, wherein the petrotechnical data ingestion system further includes a plugin interface that includes interface definitions supported by a plurality of source-specific plugins associated with a plurality of data sources to define a set of source-independent requests supported by a plurality of data source plugins;
request first petrotechnical structural and/or timeseries data from a first data source among the plurality of data sources with the REST API agent service using a source-independent request of the set of source-independent requests to an associated source-specific plugin for the first data source, wherein the source-independent request comprises a source-independent format supported by all of a plurality of source-specific plugins;

in the associated source-specific plugin for the first data source of the plurality of source-specific plugins and in response to receiving the source-independent request, requesting the first petrotechnical structural and/or timeseries data from the first data source using a source-specific request format associated with the first data source for interaction with the first data source;

in the associated source-specific plugin for the first data source of the plurality of source-specific plugins and in response to a response received from the first data source, receiving the first petrotechnical structural and/or timeseries data in the source-specific format associated with the first data source and converting via the associated source-specific plugin for the first data source of the plurality of source-specific plugins the first petrotechnical structural and/or timeseries data into the source-independent format;

receiving the first petrotechnical structural and/or timeseries data from the first data source in the source-independent format from the associated source-specific plugin for the first data source of the plurality of source-specific plugins as received first petrotechnical structural and/or timeseries data; and in the REST API agent service, publishing the received first petrotechnical structural and/or timeseries data in the source-independent format to the ingestion services component for ingestion into the petrotechnical data ingestion system.

9. The method of claim 8, wherein requesting the first petrotechnical structural and/or timeseries data from the first data source with the REST API agent service includes:

issuing the source-independent request to the associated source-specific plugin for the first data source to retrieve structural data from the first data source; and based upon the structural data retrieved from the first data source, issuing a second source-independent request to the associated source-specific plugin for the first data source to retrieve timeseries data from the first data source.

10. The method of claim 8, wherein each of the plurality of data sources includes a respective associated source-specific plugin.

11. The method of claim 10, further comprising, in the REST API agent service, detecting an associated source-specific plugin for a new data source, and in response to detecting the associated source-specific plugin for the new data source, registering the new data source with the petrotechnical data ingestion system.

12. The method of claim 11, wherein detecting the associated source-specific plugin for the new data source is performed during startup of the REST API agent service.

13. The method of claim 11, wherein detecting the associated source-specific plugin for the new data source is performed dynamically during runtime.

14. The method of claim 8, further comprising, in the ingestion services component, ingesting the received first petrotechnical structural and/or timeseries data into the petrotechnical data ingestion system by storing the received first petrotechnical structural and/or timeseries data in a datastore.

15. The method of claim 14, wherein the first petrotechnical structural and/or timeseries data includes production data, and wherein the method further comprises consuming the first petrotechnical structural and/or timeseries data stored in the datastore using a production monitoring application and/or a data analysis service.

16. A program product, comprising:

a non-transitory computer readable medium; and program code stored on the computer readable medium and configured upon execution by one or more processors to ingest petrotechnical data from a plurality of data sources, the program code implementing a petrotechnical data ingestion system that includes:

an ingestion services component configured to manage ingestion of petrotechnical structural and/or timeseries data from the plurality of data sources;

a REpresentational State Transfer (REST) Application Programming Interface (API) agent service in communication with the ingestion services component and configured to register the plurality of data sources with the petrotechnical data ingestion system;

a plurality of source-specific plugins, each source-specific plugin associated with a specific data source among the plurality of data sources and configured to retrieve petrotechnical structural and/or timeseries data from the specific data source using specific request and response formats associated with the specific data source; and a plugin interface comprising interface definitions supported by the plurality of source-specific plugins associated with the plurality of data sources to define a set of source-independent requests supported by the plurality of source-specific plugins;

wherein the REST API agent service is further configured to request first petrotechnical structural and/or timeseries data from a first data source among the plurality of data sources using a source-independent request of the set of source-independent requests to a first source-specific plugin of the plurality of source-specific plugins, wherein the first source-specific plugin is associated with the first data source, wherein the source-independent request comprises a source-independent format supported by all of the plurality of source-specific plugins;

wherein the first source-specific plugin is further configured to issue a source-specific request to the first data source in response to the source-independent request from the REST API, wherein the source-specific request comprises an appropriately-formatted source-specific format corresponding to a source-specific format of the first data source for interaction with the first data source;

wherein the first source-specific plugin is further configured to receive a response from the first data source in the appropriately-formatted source-specific format corresponding to the first data source, wherein the response comprises the first petrotechnical structural and/or timeseries data;

wherein the first source-specific plugin is further configured to convert the response from the appropriately-formatted source-specific format into the source-independent format;

wherein the REST API agent service is further configured to receive the first petrotechnical structural and/or timeseries data from the first data source in the source-independent format from the first source-specific plugin for the first data source as received first petrotechnical structural and/or timeseries data; and wherein the REST API agent service is further configured to publish the received first petrotechnical structural and/or timeseries data to the ingestion services component for ingestion into the petrotechnical data ingestion system.

* * * * *